United States Patent
Ecker et al.

(10) Patent No.: US 10,245,978 B2
(45) Date of Patent: Apr. 2, 2019

(54) VEHICLE SEAT AND METHOD FOR FIXING A SEAT ELEMENT

(71) Applicant: Johnson Controls Components GmbH & Co. KG, Kaiserslautern (DE)

(72) Inventors: Roman Ecker, Trippstadt (DE); Dirk Dubois, Hinterweidenthal (DE); Jürgen Naßhan, Kaiserslautern (DE); Erik Weber, Bedesbach (DE)

(73) Assignee: JOHNSON CONTROLS COMPONENTS GMBH & CO. KG, Kaiserslautern (DE)

( * ) Notice: Subject to any disclaimer, the term of this patent is extended or adjusted under 35 U.S.C. 154(b) by 177 days.

(21) Appl. No.: 15/101,057

(22) PCT Filed: Nov. 6, 2014

(86) PCT No.: PCT/EP2014/073870
§ 371 (c)(1),
(2) Date: Jun. 2, 2016

(87) PCT Pub. No.: WO2015/082163
PCT Pub. Date: Jun. 11, 2015

(65) Prior Publication Data
US 2016/0304010 A1      Oct. 20, 2016

(30) Foreign Application Priority Data

Dec. 4, 2013   (DE) .................. 10 2013 018 144
Apr. 9, 2014   (DE) .................. 10 2014 206 849

(51) Int. Cl.
*B60N 2/20*      (2006.01)
*B60N 2/30*      (2006.01)
*B60N 2/90*      (2018.01)

(52) U.S. Cl.
CPC ............... *B60N 2/20* (2013.01); *B60N 2/305* (2013.01); *B60N 2/309* (2013.01); *B60N 2/3031* (2013.01);
(Continued)

(58) Field of Classification Search
None
See application file for complete search history.

(56) References Cited

U.S. PATENT DOCUMENTS 4,484,776 A * 11/1984 Gokimoto ................ B60N 2/10
                                                       296/65.09
6,371,558 B1    4/2002 Couasnon
(Continued)

FOREIGN PATENT DOCUMENTS

CN      1675088 A      9/2008
DE      69411808 T2    3/1999
(Continued)

OTHER PUBLICATIONS

International Search Report and Written Opinion for international application No. PCT/EP2014/073870 dated Jan. 26, 2015.
(Continued)

*Primary Examiner* — David E Allred
(74) *Attorney, Agent, or Firm* — The Dobrusin Law Firm, P.C.

(57) ABSTRACT

The invention relates to a vehicle seat (1) comprising a seat element (2) which can be pivoted from a use position into a stowed position. Said vehicle seat comprises locking means (14). Said locking means interact with the seat element (2) in a positive and/or friction fit in a fixed position adopted in the use position, along a first direction (F) and a second direction (G).

7 Claims, 1 Drawing Sheet

(52) U.S. Cl.
CPC ........ B60N 2/933 (2018.02); *B60N 2002/971* (2018.02)

(56) References Cited

U.S. PATENT DOCUMENTS

| | | | |
|---|---|---|---|
| 7,273,254 B2 | 9/2007 | Fujita et al. | |
| 2001/0050502 A1 | 12/2001 | Fourrey et al. | |
| 2002/0125753 A1* | 9/2002 | Kammerer | B60N 2/0292 297/331 |
| 2004/0104590 A1* | 6/2004 | Kikuchi | B60N 2/01583 296/65.03 |
| 2004/0183328 A1* | 9/2004 | Daniel | B60N 2/01541 296/65.03 |
| 2006/0033373 A1 | 2/2006 | Kammerer | |
| 2008/0164740 A1* | 7/2008 | Harper | B60N 2/045 297/331 |
| 2011/0043020 A1* | 2/2011 | Nakane | B60N 2/3013 297/354.1 |
| 2011/0304184 A1* | 12/2011 | Deptolla | B60N 2/3031 297/332 |
| 2013/0062903 A1* | 3/2013 | Mather | B60N 2/2356 296/64 |
| 2014/0015296 A1* | 1/2014 | Ogata | B60N 2/3013 297/340 |
| 2015/0137549 A1 | 5/2015 | Markel | |
| 2015/0329019 A1* | 11/2015 | Abe | B60N 2/3065 296/65.09 |
| 2015/0360590 A1* | 12/2015 | Lehmann | B60N 2/065 297/340 |
| 2018/0105078 A1* | 4/2018 | Murray | B60N 2/2227 |

FOREIGN PATENT DOCUMENTS

| | | |
|---|---|---|
| DE | 10358720 A1 | 7/2005 |
| DE | 102004039249 B4 | 8/2006 |
| DE | 102012016918 A1 | 1/2014 |
| EP | 0626290 A1 | 11/1994 |
| TW | 241232 B | 2/1995 |
| WO | 03018353 A1 | 3/2003 |

OTHER PUBLICATIONS

International Preliminary Report on Patentability for International Application No. PCT/EP2014/073870, dated Jun. 16, 2016.
Chinese Office Action for Chinese Patent Application No. 201480065865.4, dated Mar. 27, 2017.
German Office Action dated Sep. 7, 2016, for application No. 102014206849.5.

* cited by examiner

VEHICLE SEAT AND METHOD FOR FIXING A SEAT ELEMENT

PRIOR ART

The invention relates to a vehicle seat having a pivotable seat element, and to a method for fixing the pivotable seat element in a use position.

Vehicle seats having a pivotable seat element are known and are arranged preferably in motor vehicles. In order to increase a storage space in the motor vehicle or an access region behind the vehicle seat, the vehicle seats are intended to be able to take up a stowage configuration. It is particularly desirable for the vehicle seat stowed in the stowage configuration to provide as much storage space as possible or as large an access region as possible behind the stowed vehicle seat. In order to realize such a stowage configuration, it is provided in the prior art that the seat element is coupled in such a manner that the seat element can be pivoted as flexibly as possible. However, the realization of a seat element which is pivotable as flexibly as possible generally makes it difficult to fix the seat element, i.e. to position and secure the seat element, in the use position.

DISCLOSURE OF THE INVENTION

It is an object of the present invention to provide a vehicle seat, the seat element of which is fixed, i.e. positioned, as securely as possible in a use position and is secured against further pivoting, wherein, at the same time, as much storage space as possible is intended to be provided behind the vehicle seat in a storage position. Furthermore, it is desirable for the seat element to be transferable into the storage position as simply as possible, i.e. with a minimum of required maneuvers.

The object is achieved by a vehicle seat having a seat element which is pivotable from a use position into a storage position, wherein the vehicle seat has a locking means, wherein, in a fixing position taken up in the use position, the locking means interacts in a form-fitting and/or force-fitting manner with the seat element along a first direction and along a second direction.

By this means, the seat element is fixed in an advantageous manner in the use position, i.e. the seat element is both positioned and also secured in relation to further pivoting. It is provided here that the form-fit along the first direction prevents further pivoting of the seat element in the direction of the storage position, and the form-fit along the second direction prevents the further pivoting beyond the use position of the seat element. In other words: the form-fit and/or force-fit along the first direction serves for securing the seat element in the use position, and the form-fit and/or force-fit along the second direction assists at least the positioning of the seat element in the use position or serves as a stop for ending the pivoting movement from the storage position into the use position. The seat element can preferably be pivoted about a secondary axis. It is furthermore conceivable for the locking means to be configured in such a manner that the locking means

- catches the seat element during the return of the seat element from the storage position into the use position, and/or
- at least partially guides the seat element as it takes up the fixing position for the use position. The first direction is preferably opposed to the second direction.

In a further embodiment, it is provided that the locking means has a pivotable locking catch, wherein the locking catch can be pivoted in order to leave the fixing position. In particular, it is provided that the locking catch has a receptacle, wherein the receptacle is configured in such a manner that, in the fixing position, the receptacle surrounds a bolt. In particular, the receptacle surrounds or engages around the bolt in such a manner that the bolt interacts in a form-fitting and/or force-fitting manner with the receptacle along the first and the second direction. Furthermore, it is provided that the locking catch can be transferred in an advantageous manner from the fixing position into a transition position by a pivoting movement if the seat element is intended to be transferred from the use position into the storage position. In particular, the receptacle has an opening through which the bolt can leave the receptacle, for example during pivoting of the locking catch into the transition position. Furthermore, it is conceivable for the seat element to be hooked in the locking catch via the bolt and to thereby be positioned. In particular, the locking catch can be pivoted about a tertiary axis.

In a further embodiment, it is provided that the vehicle seat has a backrest element, wherein the backrest element is pivotable about a primary axis relative to the seat element, wherein the locking catch can be pivoted out of the fixing position by actuation of an actuating means and/or by a pivoting movement, of the backrest element. In particular, it is provided that the backrest element is operatively connected to the locking catch. As a result, the vehicle seat can be transferred in an advantageous manner into the stowage position particularly simply, i.e. with as few maneuvers as possible. It is conceivable here that, for the transfer into the stowage configuration, the backrest element is pivoted and, as a result, the securing of the seat element is released in an advantageous manner by the locking catch.

In a further embodiment, it is provided that the locking means has a spring element with a restoring force, wherein the locking catch can be returned into the fixing position by the restoring force of the spring element. As a result, the locking catch can be guided in an advantageous manner back into the fixing position automatically or independently when the locking catch is in the transition position. It is conceivable here for the locking catch to be able to be returned into the fixing position before or after the seat element is returned into the use position. In particular, the locking catch is returned into the fixing position before the seat element is returned into the use position, and the locking catch snaps together with part of the seat element during the return of the seat element into the use position. In particular, it is provided that the spring element is configured in such a manner that the locking catch is held in the fixing position by the restoring force of the spring element. An unintended pivoting out of the fixing position can thereby be avoided in an advantageous manner.

In a further embodiment, it is provided that the seat element can be pivoted about a secondary axis along a first direction of rotation into the use position, wherein the locking catch can be pivoted along a second direction of rotation into the fixing position, wherein the first direction of rotation is opposed to the second direction of rotation. As a result, particularly stable and secure fixing of the seat element can be realized.

In a further embodiment, it is provided that the locking means has a stop, wherein, in the use position, the stop is arranged together with a part of the seat element in a form-fitting manner along the second direction. The positioning of the seat element is assisted in an advantageous manner by the stop. In particular, the stop prevents the further pivoting of the seat element as soon as the use position is taken up by the seat element. This also applies in particular during the return of the seat element from the storage position into the use position.

In a further embodiment, it is provided that the vehicle seat has an articulation system, preferably a four-bar linkage, consisting of a first link and a second link, for folding up the seat element. By means of the articulation system, the seat element can be stowed as flexibly as possible. In particular, more favorable stowage positions can be realized for the seat element in comparison to seat elements without an articulation system. It is furthermore conceivable for the seat element to be vertically adjustable via the articulation system and/or a further articulation system. In the case of a vehicle seat having an articulation system and the potential kinematics associated therewith, the fixing of the seat element by means of the locking means is particularly advantageous.

In a further embodiment, it is provided that the vehicle seat, has a rear base part, wherein the locking catch and/or the backrest element are/is coupled pivotably to the rear base part, wherein the seat element is connected to the rear base part via a third link, wherein, in the use position, the rear base part is fixed in a positionally fixed manner, and wherein the base part can be pivoted about the secondary axis in order to take up the storage position. As a result, the vehicle seat can be stowed in an advantageous manner as far forward as possible (in the direction of travel), and therefore the storage space or access region available in the stowage configuration can be realized to be as large as possible. In particular, the rear base part is pivoted over the seat element about the secondary axis into the storage position.

The invention furthermore relates to a method for fixing a seat element of one of the above-described vehicle seats, wherein
  in a first method step, the seat element is fixed by the locking means,
  in a second method step, the locking catch is pivoted,
  in a third method step, the seat element is pivoted into the storage position.

In particular, the seat element is fixed, i.e. positioned, and secured in relation to further pivoting by the form-fitting interaction of the locking element with the seat element along a first direction and along a second direction. As a result, the locking means advantageously carries out the dual function of preventing the seat element from pivoting back into the storage position, on the one hand, and of preventing further pivoting out of the use position, on the other hand.
  In a further embodiment, it is provided that
  in a fourth method step, the seat element is guided back into the use position, wherein, during the guiding of the seat element back into the use position, the pivoting movement is ended by the form-fitting interaction of the seat element with the stop and/or the locking catch,
  in a fifth method step, the fixing position is taken up by the locking catch by means of the restoring force of the spring element.

EMBODIMENTS OF THE INVENTION

In the various figures, identical parts are always provided with the same reference signs and are therefore generally also only named or mentioned once in each case.

Figure 1:
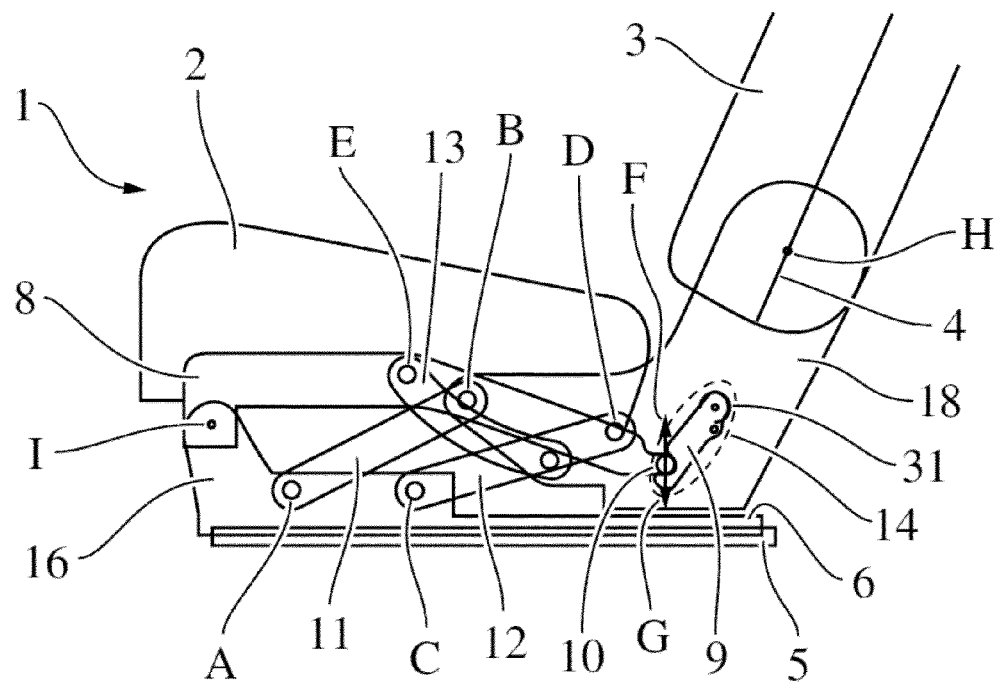
FIG. 1 shows schematically a vehicle seat according to a first illustrative embodiment of the present invention.

FIG. 1 illustrates a vehicle seat 1 according to a first illustrative embodiment of the present invention. A lower basic body together with an upper basic body preferably forms the vehicle seat. While the upper basic body comprises, for example, a backrest element 3 and a head restraint, the lower basic body preferably has a seat element 2 and a rail system. The backrest element 3 preferably comprises upholstery and a backrest frame 4. Furthermore, it is conceivable for the seat element 2 to have a seat element carrier 8 and a seat cushion or pad attached to the seat element carrier 8. The rail system preferably comprises an upper and a lower rail element 5 and 6, wherein the upper rail 6 is displaceable along a longitudinal direction of the vehicle relative to the lower rail 5 and is retainable in a retaining position. Furthermore, it is provided that the lower rail 5 is connected rigidly or fixedly to a vehicle body, in particular to a vehicle body floor. As a result, the vehicle seat 1 can be transferred along the longitudinal direction of the vehicle into a desired position. It is furthermore provided that the seat element 2 is pivotable about a secondary axis I in order to be able to fold up the seat element 2 in order to take up a storage position. As a result, a stowage configuration of the entire vehicle seat in a manner so as to save as much construction space as possible can be realized in an advantageous manner or an access region to a region located behind the vehicle seat can be enlarged. Furthermore, it is provided that the lower basic body has a front base part 16 and a rear base part 18, wherein the front base part 16 is connected to the upper rail 6 of the rail system, or forms at least part of the upper rail. The rear base part 18 is preferably arranged releasably on the upper rail 6. In particular, the rear base, part 18 is fixed to the upper rail in the use position. It is preferably provided that the backrest element 3 is coupled to the rear base part 18 in such a manner that the backrest element 3 can be pivoted relative to the seat element 2 about a primary axis H. Furthermore, the front and the rear base part 16 and 18 are connected to each other via an articulation system, preferably a four-bar linkage. As a result, the rear base part 18 can be pivoted relative to the front base part 16. Furthermore, the pivoted rear base part 18 can be aligned within the scope of the limits predetermined by the articulation system. In this case, for example, a four-bar linkage has a first link 11 and a second link 12, wherein
  the first link 11 is coupled to the front: base part. 16 so as to be pivotable about a first axis A and is coupled to the rear base part 18 so as to be pivotable about a second axis B, and
  the second link 12 is coupled to the front base part so as to be pivotable about a third axis C and is coupled to the rear base part 18 about a fourth axis D. Furthermore, it is provided that the rear base part 18 is connected to the seat element carrier 8 via third link 13. In particular, the third link is coupled to the seat element carrier 8 so as to be pivotable about a fifth axis E. By means of the first, second and third link 11, 12 and 13, the seat element 2 and the rear base part 18 can be pivoted, in particular pivoted relative to each other. Furthermore, the backrest element 3 is coupled pivotably to the rear base part 18. As a result, seat element carrier 8, rear base part 18 and backrest element 13 can be arranged in such a manner that, in the storage position, as large a storage space or access region as possible can be realized. By means of the multiplicity of links or articulation systems and the associated pivotability of a plurality of components with respect to one another, the fixing of the seat element 2, i.e. the positioning and the securing of the seat element 2, in the use position is made difficult. In order to fix the seat element 2, a locking means 14 is provided on the vehicle seat 1, preferably on the rear base part 18. The locking means 14 interacts in a fixing position in a form-fitting and/or force-fitting manner with part of the seat element 2, preferably with a bolt 10 of the seat element 2, along a first direction F and along a second direction G. By means of the form-fit along the first direction F, it is advantageously prevented that the seat element 2 can be pivoted out of the use position into the stowage position. By means of the form-fit along the second direction G, the seat element 2 is positioned in the use position. In particular, the form-fit along the second direction G ensures that a further pivoting movement is ended when the seat element 2 is returned into the use position. In particular, the second direction preferably runs parallel to a direction predetermined by gravity. In FIG. 1, the locking means 14 comprises a pivotable locking catch 9 which is coupled to the rear base part 18. In the fixing position, a bolt 10 of the seat element carrier 8 is surrounded by the locking catch 9 in such a manner that the bolt 10 interacts in a form-fitting manner along the first and the second direction F and G with the locking catch 9. As a result, the seat element 2 is fixed, i.e. positioned, in an advantageous manner and is secured in relation to a further pivoting movement. Furthermore, a spring element 31 is provided which is configured in such a manner that the locking catch 9 returns, preferably independently or automatically, into the fixing position by means of a restoring force of the spring element 31 when the locking catch 9 has been pivoted out of the fixing position into a transition position. In particular, it is provided that the locking catch 9 is pivoted into the transition position when the seat element 2 is intended to be transferred from the use position into the storage position. In the transition position, the locking catch 9 is pivoted in such a manner that the form-fit along the first direction F is canceled and, as a result, the seat element 2 can be pivoted out of the storage position. The locking catch 9 can preferably be pivoted from the fixing position into the transition position by actuation of an actuating means and/or by a pivoting movement of the backrest element 3. It is furthermore conceivable that, for the transfer of the seat element from the use position into the stowage position, the seat element 2 is lowered or raised in a manner controlled by the backrest element 3. In particular, it is provided that the backrest element 3 is operatively connected to the locking catch 9, wherein the locking catch 9 can be transferred by means of said operative connection into the transition position during the pivoting of the backrest element 3.

Figure 2:
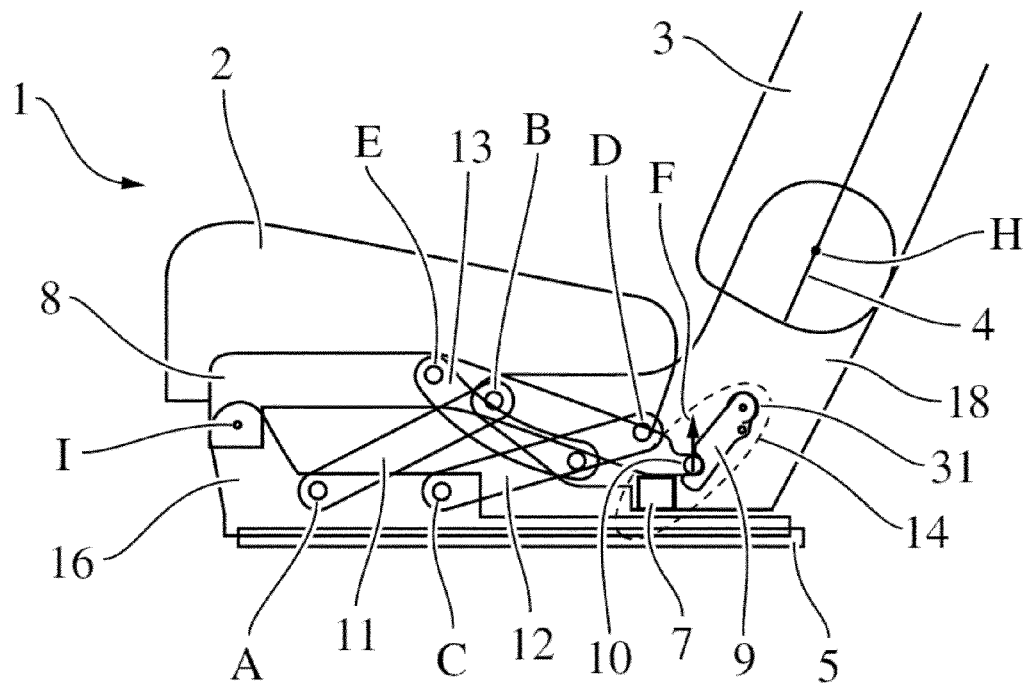
FIG. 2 shows schematically a vehicle seat according to a second illustrative embodiment of the present invention.

FIG. 2 illustrates a vehicle seat 1 according to a second illustrative embodiment of the present invention. In the second illustrative embodiment illustrated, the vehicle seat 1 of the first embodiment is supplemented by a stop 7, wherein the stop 7 is arranged in such a manner that, in the use position, the seat element 2 interacts in a form-fitting manner with the stop 7 along the second direction G. As a result, the seat element 2 is positioned in the use position. Furthermore, it is provided that, during the return of the seat element 2, the stop 7 interacts in a form-fitting manner with part of the seat element carrier 8 in such a manner that the further pivoting of the seat element 2 is prevented. As a result, the stop 7 takes over or assists the form-fit of the locking means 14 with the seat element 2 in an advantageous manner. The seat element 2 and the stop 7 preferably enter into contact along a contact surface in the fixing position, wherein a side surface of the seat element 2 and a side surface of the stop 7 are configured in such a manner that the side surface of the seat element 2 and the side surface of the stop 7 are matched to each other in order to form the contact surface.

LIST OF REFERENCE SIGNS 1 vehicle seat
2 seat element
3 backrest element
4 backrest frame
5 lower rail
6 upper rail
7 stop
8 seat element carrier
9 locking catch
10 bolt
11 first link
12 second link
13 third link
14 locking means
16 front base part
18 rear base part
31 spring element
A first axis
B second axis
C third axis
D fourth axis
E fifth axis
F first direction
G second direction
H primary axis
I secondary axis

The invention claimed is:

1. A vehicle seat having a seat element which is pivotally mounted to a front base part at a secondary axis for movement from a use position into a storage position,
    wherein the vehicle seat has a locking means;
    wherein, in a fixing position taken up in the use position, the locking means interacts with the seat element in a first direction or a second direction in a form-fitting manner or a force-fitting manner;
    wherein the locking means has a pivotable locking catch pivotally supported on a rear base part of the vehicle seat;
    wherein the locking catch interacts in the fixing position in the form-fitting or the force-fitting manner with a bolt fixed to the seat element;
    wherein the locking catch is configured to be pivoted in order to leave the fixing position;
    wherein the vehicle seat has an articulation system that is a four-bar linkage having a first link pivotally connected to each of the front base part and the rear base part and a second link pivotally connected to each of the front base part and the rear base part for folding up the seat element; and
    wherein the seat element is connected to the rear base part via a third link that forms a scissor linkage with at least a portion of the seat element, wherein, in the use position, the rear base part is fixed in a positionally fixed manner, wherein the four-bar linkage and the scissor linkage are configured such that the base part is pivoted about the secondary axis in order to take up the storage position.

2. The vehicle seat as claimed in claim 1, wherein the vehicle seat has a backrest element, wherein the backrest element is pivotable about a primary axis relative to the seat element, wherein the locking catch can be pivoted out of the fixing position by a pivoting movement of the backrest element.

3. The vehicle seat as claimed in claim 1, wherein the locking means has a spring element with a restoring force, wherein the locking catch can be returned into the fixing position by the restoring force of the spring element.

4. The vehicle seat as claimed in claim 1, wherein the seat element can be pivoted about a secondary axis along a first direction of rotation into the use position, wherein the locking catch can be pivoted along a second direction of rotation into the fixing position, wherein the first direction of rotation coincides with the second direction of rotation.

5. The vehicle seat as claimed in claim 1, wherein the locking means has a stop, wherein, in the use position, the stop is arranged together with a part of the seat element in the form-fitting manner along the second direction.

6. The vehicle seat as claimed in claim 1, wherein the articulation system consists of a first link and a second link for folding up the seat element.

7. The vehicle seat as claimed in claim 2, wherein the backrest element is pivotally coupled to the rear base part.

\* \* \* \* \*